(12) United States Patent
Speers

(10) Patent No.: US 12,654,815 B2
(45) Date of Patent: Jun. 16, 2026

(54) PORTABLE BOAT SEAT MOUNTING SYSTEM

(71) Applicant: Quintin Speers, Brooklyn Park, MN (US)

(72) Inventor: Quintin Speers, Brooklyn Park, MN (US)

( * ) Notice: Subject to any disclaimer, the term of this patent is extended or adjusted under 35 U.S.C. 154(b) by 653 days.

(21) Appl. No.: 17/472,817

(22) Filed: Sep. 13, 2021

(65) Prior Publication Data

US 2023/0084795 A1     Mar. 16, 2023

(51) Int. Cl.
B63B 29/04         (2006.01)
B60N 2/28          (2006.01)

(52) U.S. Cl.
CPC ............... B63B 29/04 (2013.01); B60N 2/28 (2013.01); B60N 2/2821 (2013.01); B63B 2029/043 (2013.01)

(58) Field of Classification Search
CPC ...... B63B 29/04; B63B 2029/043; A47C 1/16
USPC ....................................... 297/344.21, 256.16
See application file for complete search history.

(56) References Cited

U.S. PATENT DOCUMENTS

| | | | | | |
|---|---|---|---|---|---|
| 4,398,766 A | * | 8/1983 | Everett | ................... | B63B 29/04 |
| | | | | | 297/363 |
| 4,802,708 A | * | 2/1989 | Vos | ......................... | B63B 29/04 |
| | | | | | 248/316.4 |
| 4,898,113 A | * | 2/1990 | Tapley | .................... | B63B 32/64 |
| | | | | | 114/283 |
| 5,082,328 A | * | 1/1992 | Garelick | ................. | B63B 29/04 |
| | | | | | 297/344.21 |
| 5,318,339 A | * | 6/1994 | Cherniak | ............... | B60N 2/245 |
| | | | | | 297/250.1 |
| 5,433,510 A | * | 7/1995 | Pestel | ..................... | B63B 7/085 |
| | | | | | 248/501 |
| 5,685,514 A | * | 11/1997 | Carnahan | ............... | A47B 11/00 |
| | | | | | 248/349.1 |
| 6,015,188 A | * | 1/2000 | Yundt | .................. | B60N 2/6054 |
| | | | | | 297/344.21 |
| 10,994,814 B1 | * | 5/2021 | Hart | ........................ | B63B 29/04 |
| 2011/0109135 A1 | * | 5/2011 | Davis, Jr. | ............... | A47C 7/727 |
| | | | | | 297/344.21 |
| 2015/0158561 A1 | * | 6/2015 | Gonzales, III | .......... | B63B 34/26 |
| | | | | | 114/363 |
| 2016/0159437 A1 | * | 6/2016 | Pappas | ................... | B63H 20/02 |
| | | | | | 114/352 |
| 2021/0214053 A1 | * | 7/2021 | Gilpin | ..................... | B63B 32/40 |

FOREIGN PATENT DOCUMENTS

WO     WO-2015031941 A1 *    3/2015    ............. B63B 29/04

* cited by examiner

*Primary Examiner* — David R Dunn
*Assistant Examiner* — Tania Abraham
(74) *Attorney, Agent, or Firm* — Malcolm Pipes

(57)         ABSTRACT

A portable boat mounting device configured to be secured to a fixed seating area of a boat, is described. The portable mounting device includes a swivel seat assembly affixed to one or more mounting brackets. The swivel seat assembly includes a seat base affixed to one or more mounting brackets. The swivel seat assembly includes a mounting plate, affixed to the seat base forming a connection to each other with a rotational relationship about a common axis. The mounting plate includes a plurality of mounting slots configured to receive a fastening device. The mounting plate includes a seat base comprising one or more mounting slots configured to receive the fastening device.

18 Claims, 7 Drawing Sheets

PORTABLE BOAT SEAT MOUNTING SYSTEM

TECHNICAL FIELD

This invention relates to the field of portable seating devices. Specifically, the present invention pertains to a portable boat seat mounting system.

BACKGROUND

Many fishing and Jon-type boats are factory-equipped with backless, bench-style seats that are uncomfortable and are permanently fixed in place, giving the user little flexibility when it comes to seating.

Avid outdoorsmen, water lovers, and fisherman often acquire boats that are easy for transport, affordable and easily movable. These boats are often considered to be jon-type boats or flat-bottomed boats constructed of aluminum, fiberglass, or wood with one, two, or three bench seats. They are suitable for fishing, hunting and just cruising around. These types of boats are simple, easy to maintain, and provide many options for customization and comfort. Often times, these boats include backless, bench-style seats that are uncomfortable and are permanently fixed in place, giving the user little flexibility when it comes to seating. These types of seating are very limited in the type of comfort that can be provided, and some instances are considered to be nonfunctional. In order to upgrade these seating options, seat assemblies are utilized in order to attach a more comfortable seating option that may offer back support, additional cushion, or angles of seating to the occupant.

These seating options often include swivel plate assemblies that allow for the seating option to rotate in one or more directions in order to allow an occupant to achieve their desire of comfort, viewing range, or fishing angle. Conventional swivel plate assemblies include a seat mounting plate conjoined in a rotational relationship with a base plate such that plates rotate relative to each other about a common axis. Typically, the base plate is fixedly secured to a bench-type seat to enable rotational movement of a seat, e.g., a boat seat, fixedly secured to the seat mounting plate. Fastening devices such as bolts, nuts and bolts, etc. used for affixing the base plate generally prevent the removal or relocation of the seat without expending additional effort.

Thus, it would be desirable to provide a way to retrofit a bench-style boat seat or thwart with an adjustable and more comfortable swivel seat. Accordingly, there exists a need for a portable swivel seat base which can easily and quickly secure and un-secure a seat to a bench-type seat with minimal effort.

The aspects or the problems and the associated solutions presented in this section are not necessarily approaches that have been previously conceived or pursued. Therefore, unless otherwise indicated, it should not be assumed that any of the approaches presented in this section qualify as prior art merely by virtue of their presence in this section of the application.

SUMMARY OF THE INVENTION

A portable boat mounting device configured to be secured to a fixed seating area of a boat, is described. The portable mounting device includes a swivel seat assembly affixed to one or more mounting brackets. The swivel seat assembly includes a seat base affixed to one or more mounting brackets. The swivel seat assembly includes a mounting plate, affixed to the seat base forming a connection to each other with a rotational relationship about a common axis. The mounting plate includes a plurality of mounting slots configured to receive a fastening device. The seat base includes one or more mounting slots configured to receive the fastening device. The fastening device is configured to extend through the one or mounting slots, fixedly securing the base plate to the mounting bracket.

In one embodiment, the fastening device is a nut and bolt fastener.

In one embodiment, the mounting bracket is s-shaped.

In one embodiment, the mounting bracket includes a leg, a first arm, a second arm, and a longitudinally extending open channel defined by the leg and a lip formed by a longitudinally extending edge of the second arm.

In one embodiment, the seat base is removably secured to a bench-type seat with at least one tie-down device.

In one embodiment, the at least one tie-down device is a ratchet strap or over center quick release buckle and strap assembly.

In one embodiment, the tie-down strap is configured to extend through an open channel or slot of the mounting bracket and wrap around and under the bench-type seat.

In one embodiment, the at least one tie-down device is one or more of a set of polyester, nylon, polypropylene or metal straps.

In one embodiment, the mounting plate comprises a plurality of mounting slots through which a fastening device extends to fixedly securing the seat mounting plate to an underside of a seat.

In one embodiment, the base plate is configured to integrate with the mounting bracket to form a unitary device.

This summary is provided merely for purposes of summarizing some example embodiments, so as to provide a basic understanding of some aspects of the subject matter described herein.

Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

Disclosed herein are embodiments of a portable swivel seat assembly. The accompanying figures are included to provide a further understanding of the invention, and are incorporated in and constitute a part of this specification. The figures illustrate embodiments of the invention and, together with the description, serve to explain the principles of the invention.

The foregoing and other objects, aspects, features, and advantages of the disclosure will become more apparent and better understood by referring to the following description taken in conjunction with the accompanying drawings, in which.

Figure 1:
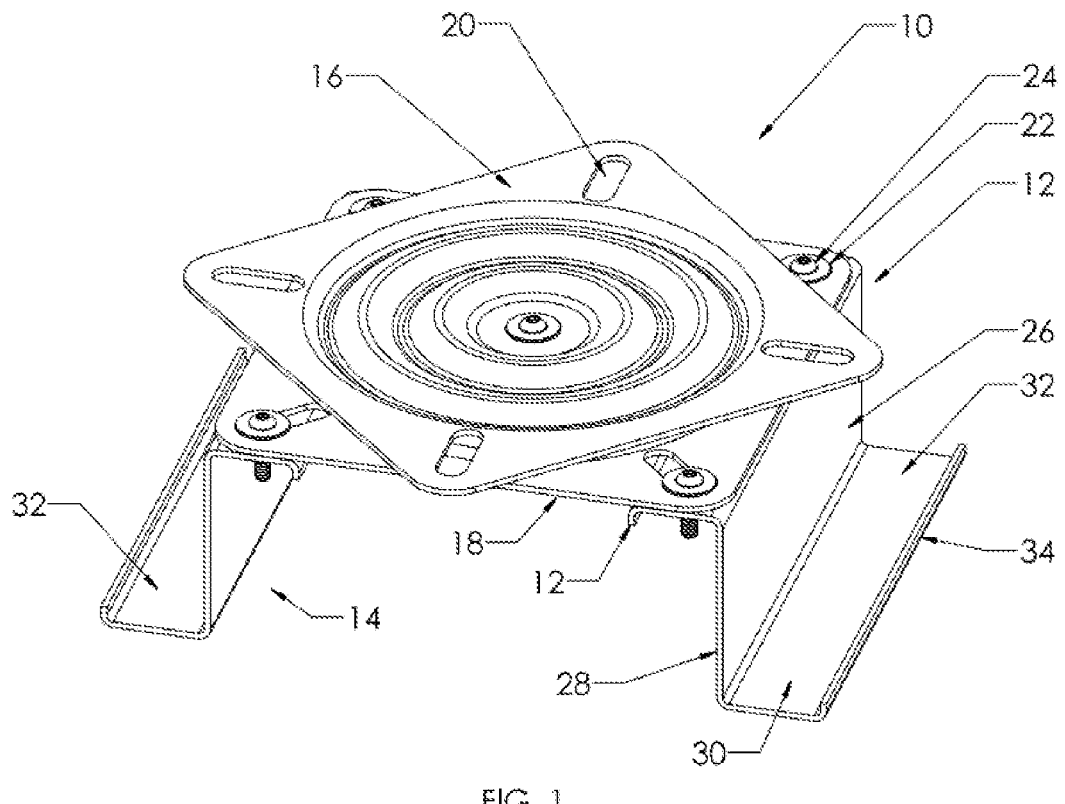
FIG. 1 is a perspective view of a portable swivel seat assembly in accordance with an embodiment.

Elements in the figures are illustrated for simplicity and clarity and have not been drawn to scale. For example, the dimensions and/or relative positioning of some of the elements in the figures may be exaggerated relative to other elements to help to improve understanding of various embodiments of the present invention.

Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required.

The terms and expressions used herein have the ordinary technical meaning as is accorded to such terms and expressions by persons skilled in the technical field as set forth above except where different specific meanings have otherwise been set forth herein.

DETAILED DESCRIPTION

Some detailed example embodiments are disclosed herein. However, specific structural and functional details disclosed herein are merely representative for purposes of describing example embodiments. Example embodiments may, however, be embodied in many alternate forms and should not be construed as limited to only the embodiments set forth herein.

The invention may be embodied in other specific forms without departing from the spirit of essential characteristics thereof. The present embodiments therefore to be considered in all respects as illustrative and not restrictive, the scope of the invention being indicated by the appended claims rather than by the foregoing description, and all changes which come within the meaning and range of equivalency of the claims are therefore intended to be embraced therein.

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

The following description is not to be taken in a limiting sense, but is made merely for the purpose of describing the general principles of exemplary embodiments. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

While multiple embodiments of the instant invention are disclosed, alternate embodiments may become apparent to those skilled in the art. The following detailed description is that of non-limiting embodiments of the invention with reference to the accompanying drawings wherein like elements are designated by like numerals. It should be clearly understood that there is no intent, implied or otherwise, to limit the invention in any form or manner to that described herein. As such, all alternatives are considered as falling within the metes and bounds of the instant invention.

FIG. 1 is a perspective view of a portable swivel seat assembly in accordance with an embodiment. The portable swivel seat assembly includes a swivel seat base that includes a swivel plate assembly 12 affixed to a set of mounting brackets 14. The swivel plate assembly 12 includes a conjoined seat mounting plate 16 and a base plate 18 connected to each other in a rotational relationship about a common axis. The common axis is shared where the seat mounting plate 16 is positioned above the base plate 18, allowing the seat mounting plate 16 to rotate about the axis of the base plate 18. The seat mounting plate 16 includes a plurality of mounting slots 20 through which a fastening device 24 extends for fixedly securing seat mounting plate 16 to an underside of a seat. The fastening device 24 in a preferred embodiment can be a bolt and nut device, or any other device that is able to secure the seat to the base while allowing the ability to swivel in a first direction and a second direction. The base plate 18 includes one or more mounting slots 20 through which the nut and bolt assembly, extends for fixedly securing the base plate 18 to the set of mounting brackets 14. The mounting brackets 14 are positioned to provide the base plate 18 a height of at least a half of an inch to provide clearance from a bench of the boat to a boat seat attached to the swivel seat assembly.

Figure 2:
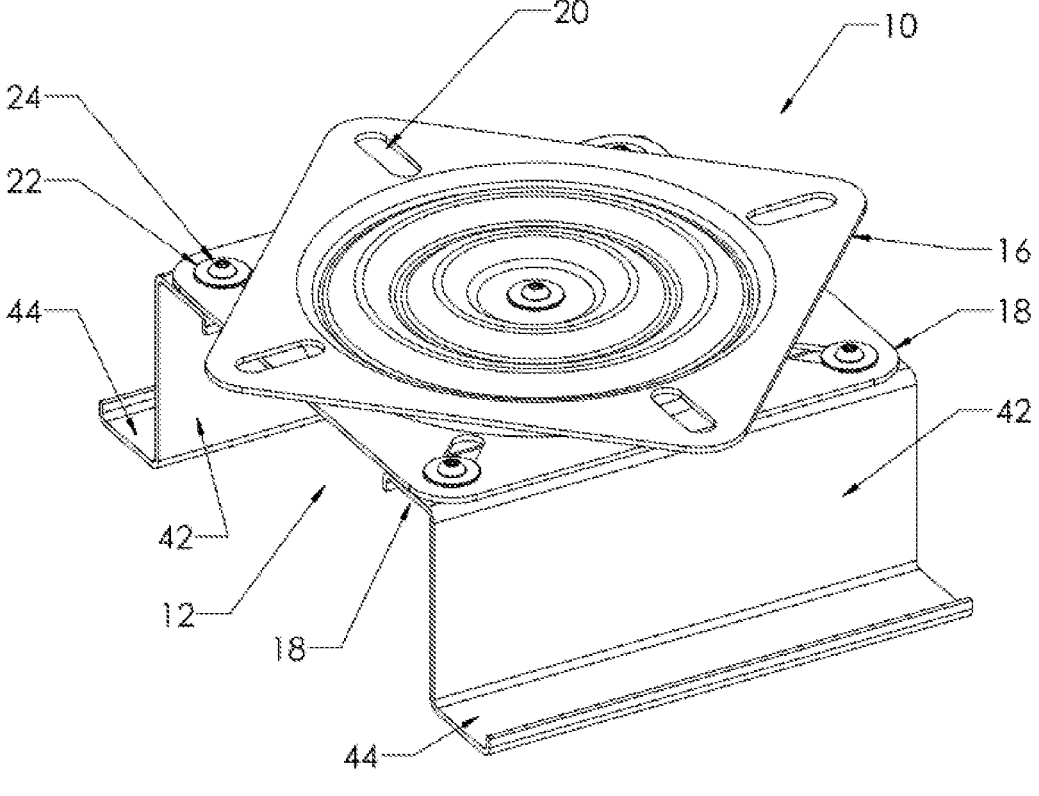
FIG. 2 is a perspective view of a mounting bracket for the portable swivel seat assembly, in accordance with an example.

FIG. 2 is a perspective view of a mounting bracket for the portable swivel seat assembly. As illustrated in FIGS. 1 and 2, mounting bracket 14 is generally S-shaped comprising a first arm 26, a leg 28, a second arm 30 and longitudinally extending open channel 32 defined by leg 28 and lip along a longitudinally extending edge of second arm 30. The first arm 26 includes one or more holes or slots through which fastening device 24 extends for fixedly securing base plate 18 to mounting brackets 14 as illustrated in FIG. 1. In the embodiments shown in FIGS. 1 and 2, first arm 26 includes at least two holes (or slots) that are aligned with at least two corresponding slot (or holes) in base plate 18. The brackets allow the swivel assembly to sit a height above the bench of a boat or seating area, while also allowing enough clearance for a securing device to be securely attached to the bracket system to removably attach the bracket to the bench.

Figure 3:
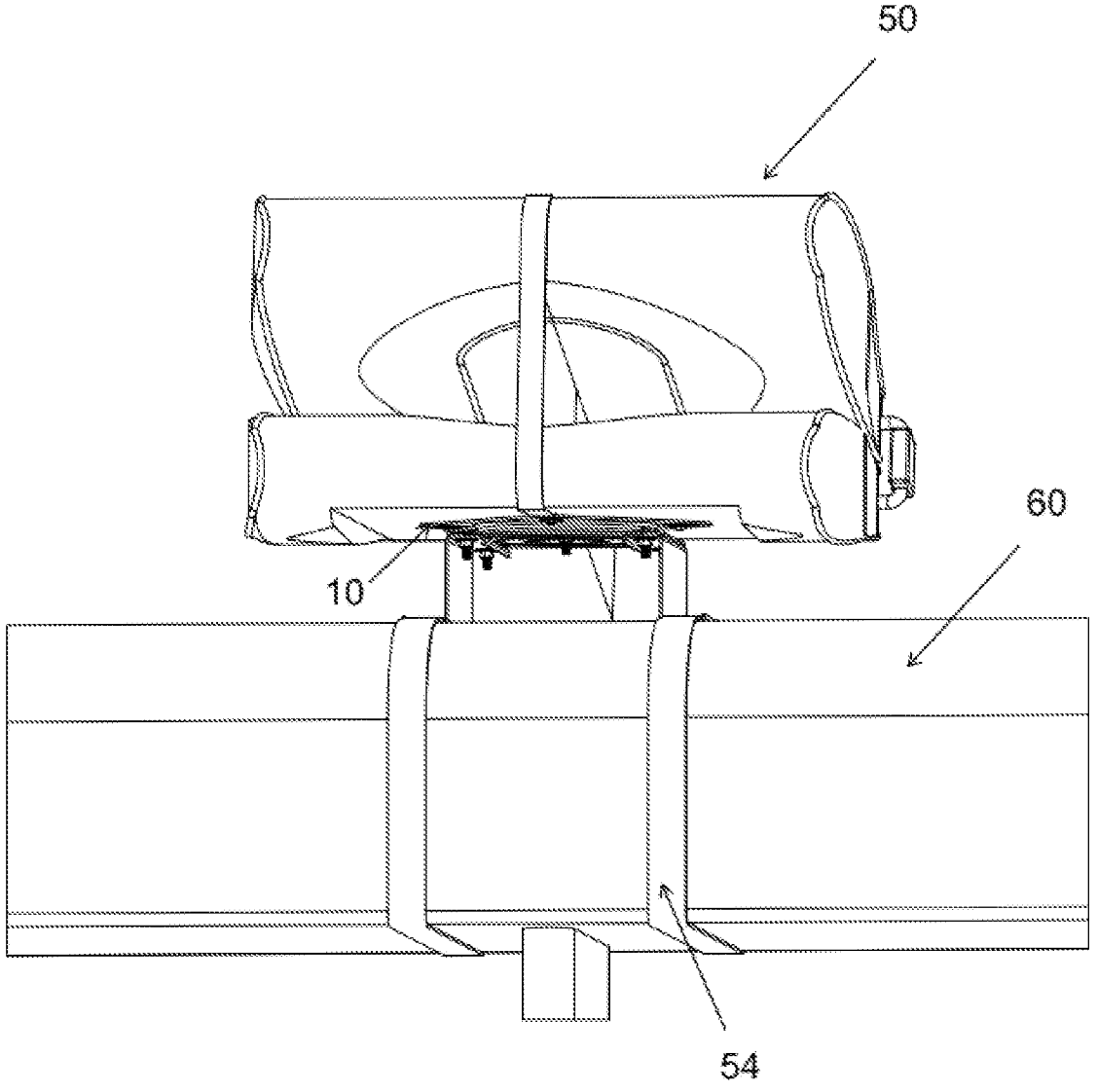
FIG. 3 illustrates a securing devices in use with the portable swivel seat assembly, in accordance with an example.
Figure 6:
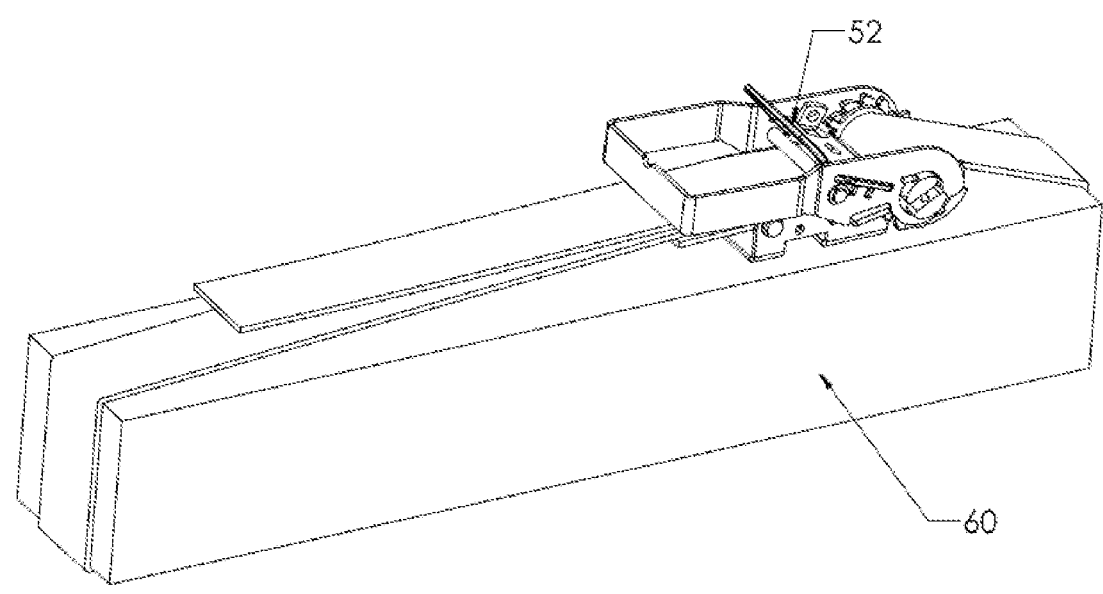
FIG. 6 is a securing device, specifically a ratcheting device used to secure the device to the bench, in accordance with an example.

Accordingly, the portable swivel seat base 10 is removably secured to a bench-type seat with at least one tie-down device. In a preferred embodiment, the tie down device 52 can be one or more ratchet or quick release straps 54, as illustrated in FIG. 3 and FIG. 6. The ratchet strap can have at least a portion thereof extending through each open channel 32 and wrapped around and under the bench-type seat 60. The ratchet or quick release strap can then be ratcheted, or buckled down tightly, to secure the seat to the bench 60, providing the necessary secured tightness needed, while also providing the ability to loosen, and adjust when a seat needs to be portable or moved to a different location.

The lip aids in retaining at least a portion of tie-down device 52 within open channel 32, thereby inhibiting the set of tie-down devices 52 from dislodging from the open channel 32. Alternate forms of tie-down devices can include one or more of metal straps 52, or other tie down devices 52 that are considered as falling within the metes and bounds of the instant invention, as described within this disclosure.

Figure 4:
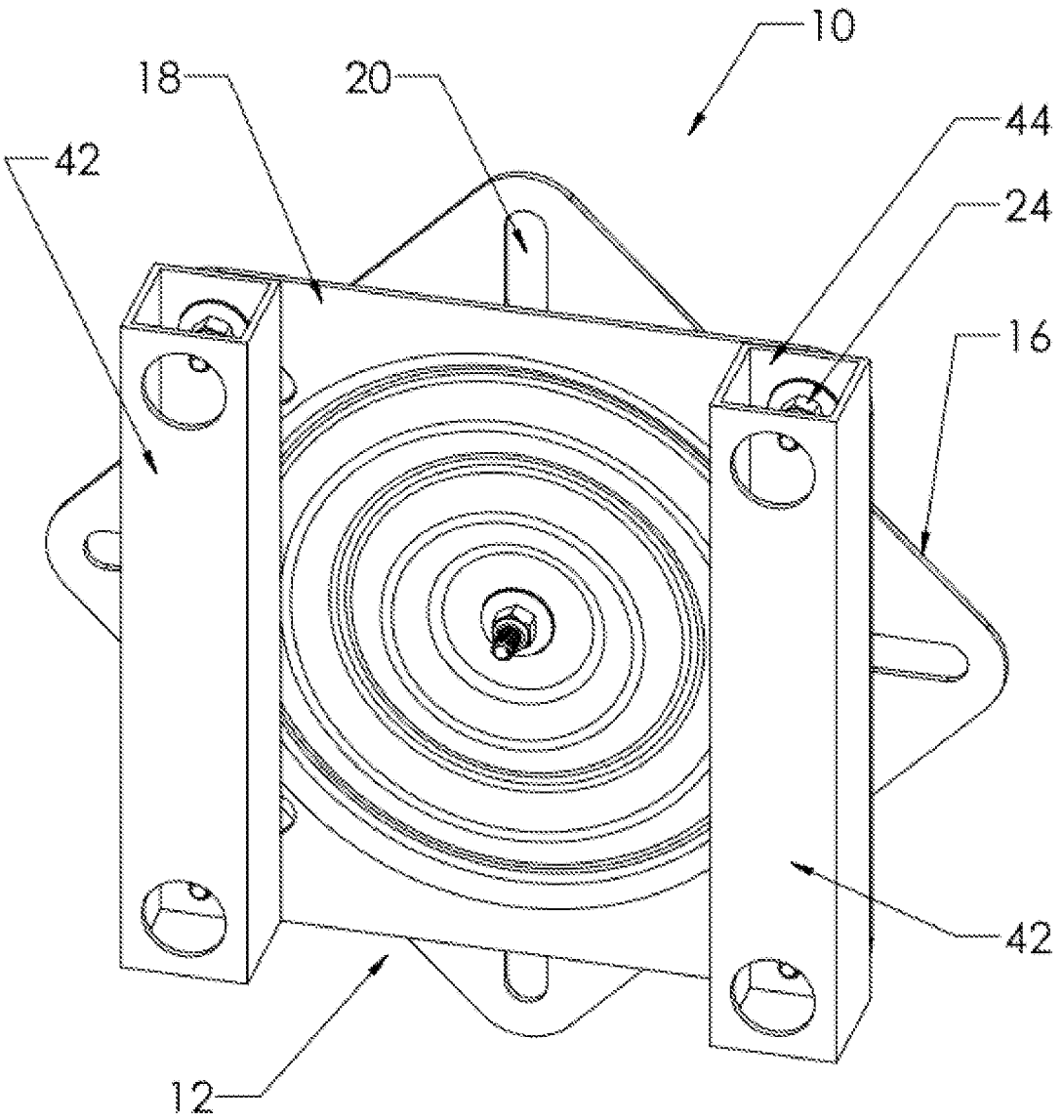
FIG. 4 is a bottom perspective view of a portable swivel seat assembly, in accordance with an example.

FIG. 4. is a bottom perspective view of portable swivel seat base 10 in accordance with an alternate embodiment of the invention. The portable swivel seat base 10 includes a swivel plate assembly 12 affixed to mounting brackets 14. In the embodiment of portable swivel seat base 10 illustrated in FIG. 4, each mounting bracket is a hollow tube defining longitudinally extending enclosed channel 44. Although not shown, at least one side of each mounting bracket includes at least two holes or slots that align with mounting slots 20 of base plate 18. Each of these holes can be utilized for additional securing to an additional mount adapter or to secure the seat base directly the bench 60 itself if needed for a permanent fixture. Fastening devices 24, such as a nut and bolt assembly, are positioned to extend through the holes or slots in the top of mounting bracket and mounting slots 20 fixedly secure base plate 18 to mounting brackets 14.

Figure 5:
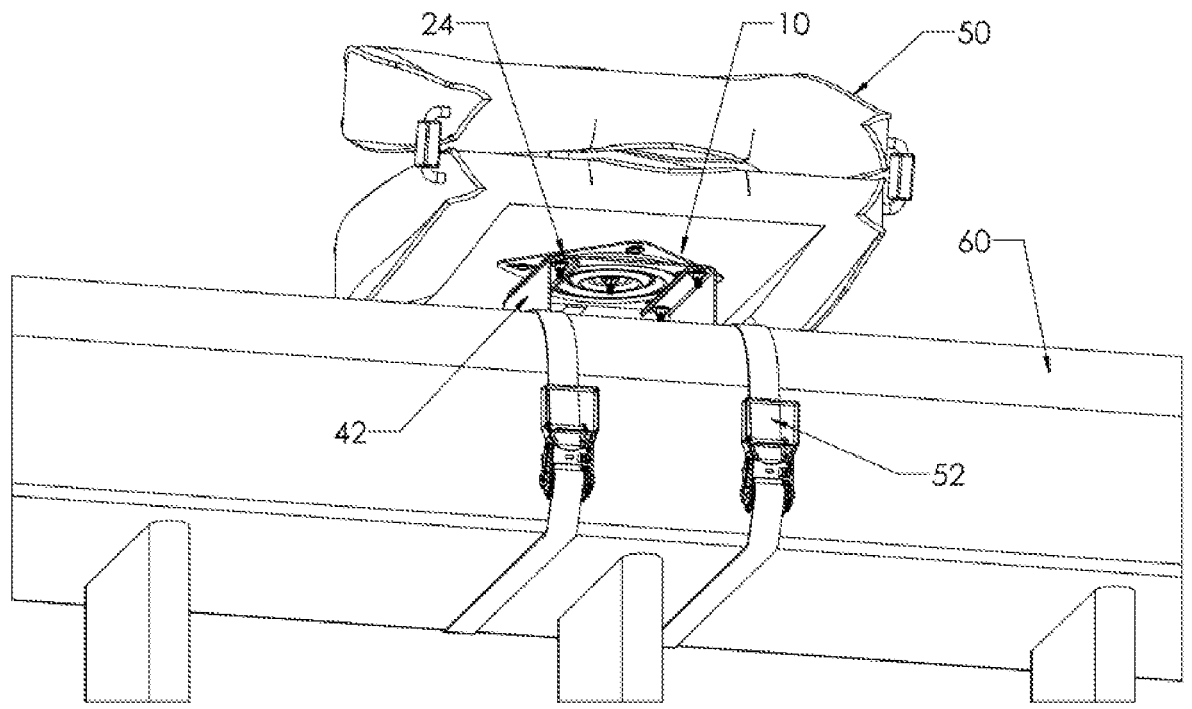
FIG. 5 is a mounted, front perspective view of the portable swivel seat assembly, in accordance with an example.

Referring now to FIG. 5, and as described in reference to FIG. 4, portable swivel seat base 10 is illustrated fixedly secured to underside of seat, e.g., a boat seat, with fastening devices 24, e.g., a bolt, extending through slots in seat mounting plate 16. Portable swivel seat base 10 is removably secured to a bench-type seat 60 with at least one tie-down device 52, e.g., a ratchet or quick release strap, having at least a portion 54 thereof extending through each enclosed channel 44 and wrapped around and under the bench-type seat. Longitudinally extending enclosed channels 44 aid in retaining tie-down device 52 therewithin.

In one embodiment, the base plate 18 of the swivel plate assembly 12 and set of mounting brackets 14 are illustrated as separate pieces or components that are fixedly secured to one another with fastening devices 24. Similarly, in the embodiment of the portable swivel seat base 10, base plate 18 of swivel plate assembly 12 and mounting brackets 14 can also be constructed as separate pieces or components that are fixedly secured to one another with fastening devices 24. Alternatively, the portable swivel seat base 10, the base plate 18 and the mounting brackets 14 can be constructed as a single unit.

The additional embodiments disclosed are in addition to or in accordance with the aforementioned description. Each of these embodiments as described are alternate embodiments of the swivel seat base, which comprises a swivel plate assembly 12 that includes a seat mounting plate 16 that is conjoined in a rotational relationship with a unitary base plate 18 comprising a base plate 18 integrated with one or more mounting brackets 14.

In one embodiment, the unitary base plate 18 can include open channels 32 defined by lips. The lips are configured to aid in retaining tie-down device within open channels 32, thereby preventing any accidental dislodging from open channels.

In one embodiment the open channels 32 are oriented inwardly and positioned to "tuck under" the base and seat mounting plate 16.

In one embodiment, the base plate 18 comprises partially open channels 32 that are defined by overhangs. The overhangs aid in retaining tie-down device within partially open channels 32, thereby preventing any accidental dislodging from partially open channels 32.

In one embodiment, the base plate 18 comprises partially open channels 32 defined by overhangs. The base plate 18 includes partially open channels 32 that are oriented inwardly and tucked under the base and seat mounting plate 16 in contrast to partially open channels 32 being oriented outwardly.

In one embodiment, the base plate 18 comprises longitudinally extending enclosed channels 44. The portable swivel seat base 10 is removably secured to a bench-type seat 60 with at least one tie-down device, having at least a portion thereof extending through each longitudinally extending channel 44 and wrapped around and under the bench-type seat 60. Longitudinally extending enclosed channels 44 aid in retaining tie-down device therewithin.

In one embodiment, the longitudinally extending enclosed channels 44 are oriented inwardly and tucked under the base and seat mounting plate 16 in contrast to longitudinally extending enclosed channels 44 being oriented outwardly. The longitudinally extending enclosed channels 44 aid in retaining tie-down device therewithin.

As is evident from the numerous non-limiting embodiments of portable swivel seat base 10s illustrated in FIGS. 1 and 5, the base plates 18 include "legs" or "extensions". Accordingly, the seat mounting plate 16, and therefore the seat secured thereto, will be somewhat elevated from the bench-type seat 60 on which the portable swivel seat bases 10 are removably secured. Further non-limiting embodiments of a portable swivel seat base 10 include those without "legs" or "extensions", such as legs.

In one embodiment, the base plate 18 is a one single piece or unitary piece version of mounting brackets 14 integrated with the base plate 18 without legs.

In one embodiment, the base plate 18 comprises open channels 32 defined by walls (or protrusions). The portable swivel seat base 10 is removably secured to a bench-type seat 60 with at least one tie-down device 52 having at least a portion 54 thereof extending through each open channel 32 and wrapped around and under the bench-type seat. The wall aid in retaining tie-down device 52 within open channels 32, thereby inhibiting tie-down device 52 from accidentally dislodging from open channels 32.

While the embodiments of the portable swivel seat bases 10 described herein illustrate a swivel plate assembly 12 comprising proximately co-located seat mounting plate 16 conjoined in a rotational relationship with base plate 18, alternate embodiments of swivel plate assemblies are considered as being with the metes and bounds of the instant invention. For example, the one or more swivel plate assemblies in alternate non-limiting embodiments can be a pedestal swivel plate assembly 12 wherein the seat mounting plate 16 is at a distance from the base plate 18 as is well known in the art.

Figure 7:
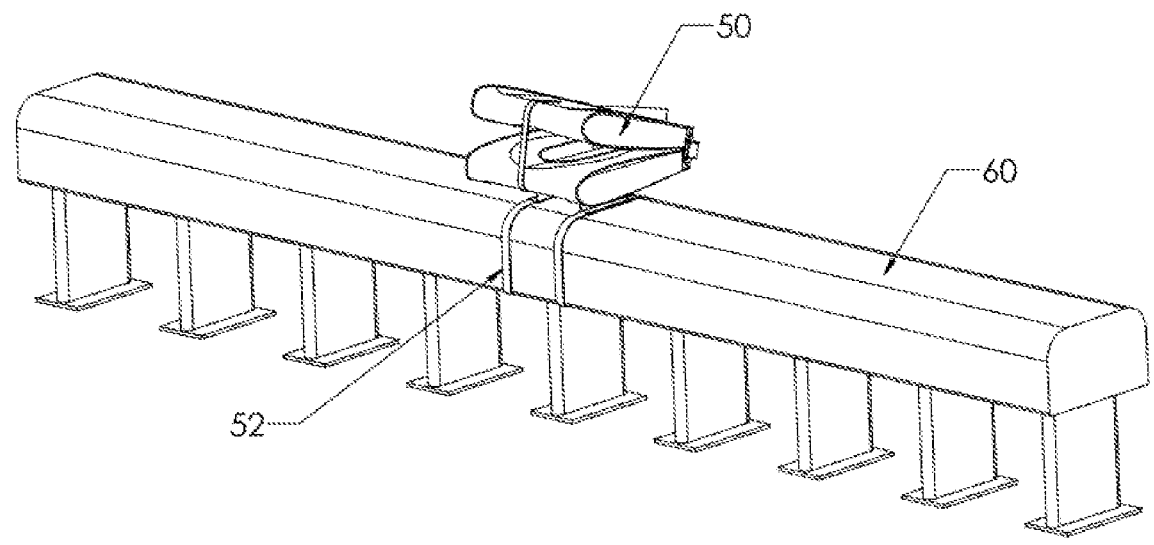
FIG. 7 depicts a perspective view of the portable boat mounting device secured to a fixed seating area, in accordance with an example.

FIG. 7 depicts a perspective view of the portable boat mounting device secured to a fixed seating area. One the portable mounting device is installed into the fixed seating area or bench 60, a user has the ability to adjust the seat's position along a longitudinal axis of the bench 60. The user can adjust the seat 50 by loosening one ore more of the tie-down devices 52 in order to move the device in a first direction or a second direction. For example, in some instances the user may position themselves on the near side of a boat, while in other instances the user may wish to position themselves on a far side of a boat. In yet other instances the user may wish to sit in the center of the boat, where the user may be operating the boat, fishing, hunting, or performing another operation activity. The ease of adjustment of the mounting device, allows the user to have the advantage of quickly adjusting their position, or removing the device in an efficient manner, and without causing must movement in the boat area if on water.

Although the present invention has been described in terms of various embodiments, it is not intended that the invention be limited to these embodiments. Modification within the spirit of the invention will be apparent to those skilled in the art.

It is additionally noted and anticipated that although the device is shown in its most simple form, various components and aspects of the device may be differently shaped or modified when forming the invention herein. As such those skilled in the art will appreciate the descriptions and depictions set forth in this disclosure or merely meant to portray examples of preferred modes within the overall scope and intent of the invention and are not to be considered limiting in any manner.

While all of the fundamental characteristics and features of the invention have been shown and described herein, with reference to particular embodiments thereof, a latitude of modification, various changes and substitutions are intended in the foregoing disclosure and it will be apparent that in some instances, some features of the invention may be employed without a corresponding use of other features without departing from the scope of the invention as set forth. It should also be understood that various substitutions, modifications, and variations may be made by those skilled in the art without departing from the scope of the invention.

What is claimed is:

1. A portable mounting device configured to be secured to a fixed seating area comprising:
   a swivel seat assembly comprised of a swivel seat base that includes a swivel plate assembly affixed to one or more elevated mounting brackets, the swivel plate assembly comprising a conjoined mounting plate and a base plate connected to each other in a rotational relationship about a common axis, comprising:
   the base plate attached to a bottom of the swivel seat assembly affixed to the one or more elevated mounting brackets and the mounting plate interposed between the swivel seat of the swivel seat assembly and the base plate; and
   the mounting plate affixed to the base plate forming a connection to each other with the rotational relationship about a common center perpendicular axis with the base plate fixed and the mounting plate rotatable;
   wherein the mounting plate comprises a plurality of elongated mounting slots each configured to receive a first set of fastening devices to attach the mounting plate to the swivel seat base;
   wherein the base plate comprises at least four elongated mounting slots configured to receive a second set of fastening devices, the fastening devices extending through the at least four mounting slots, fixedly securing the swivel seat to the base plate and the elevated mounting bracket extending up from a surface;
   wherein the elevated mounting bracket provides at least a ½ inch clearance and the elevated mounting bracket further comprises at least one channel for receiving at least one tie-down device to secure the swivel seat assembly.

2. The portable mounting device of claim 1, wherein the fastening device is a nut and bolt fastener.

3. The portable beat mounting device of claim 1, wherein the mounting bracket is s-shaped.

4. The portable mounting device of claim 3, wherein the mounting bracket comprises:
   a leg;
   a first arm;
   a second arm; and
   a longitudinally extending open channel defined by the leg and a lip formed by a longitudinally extending edge of the second arm.

5. The portable mounting device of claim 1, wherein the seat base is removably secured to a bench-type seat with the at least one tie-down device.

6. The portable mounting device of claim 5, wherein the at least one tie-down device is a ratchet strap or over center quick release buckle and strap assembly.

7. The portable mounting device of claim 5, wherein the tie-down device comprises a strap configured to extend through an open channel or slot of the mounting bracket and wrap around and under the bench-type seat.

8. The portable mounting device of claim 5, wherein the at least one tie-down device is one or more of a set of polyester, nylon, polypropylene or metal straps.

9. The portable mounting device of claim 1, wherein the mounting plate comprises a plurality of mounting slots through which a fastening device extends to fixedly secure the mounting plate to an underside of a seat.

10. The portable mounting device of claim 1, wherein the base plate is configured to integrate with the mounting bracket to form a unitary device.

11. A portable mounting device for securing a swivel seat to an object, comprising:
    a swivel seat assembly affixed to a base plate and at least one elevated mounting bracket and a mounting plate interposed between the swivel seat assembly and the base plate;
    the mounting plate affixed to the base plate with a rotational relationship about a common center perpendicular axis, the mounting plate rotatable and the base plate fixed;
    wherein the mounting plate comprises at least four elongated mounting slots each configured to receive a first set of fastening devices to attach to a swivel seat base;
    wherein the base plate comprises at least four elongated mounting slots configured to receive a second set of fastening devices, the second set of fastening devices extending through the at least four mounting slots, fixedly securing the seat base plate to the mounting plate and elevated mounting bracket;
    wherein the elevated mounting bracket further comprises at least one channel for receiving at least one tie-down device to secure the swivel seat assembly.

12. The portable mounting device for securing a swivel seat to an object of claim 11, wherein the fastening device is a nut and bolt fastener.

13. The portable mounting device for securing a swivel seat to an object of claim 11, wherein the mounting bracket is s-shaped.

14. The portable mounting device of claim 11, wherein the mounting bracket comprises:
    a leg;
    a first arm;
    a second arm; and
    a longitudinally extending open channel defined by the leg and a lip formed by a longitudinally extending edge of the second arm and receiving at least one tie-down device.

15. The portable mounting device of claim 11, wherein the at least one tie-down device is a ratchet strap or over center quick release buckle and strap assembly.

16. A portable swivel seat, comprising:

a base plate attached underneath the swivel seat affixed to a mounting plate with at least one elevated bracket supporting the base plate;

the mounting plate affixed to the base plate creating a rotational relationship about a common center perpendicular axis, the mounting plate rotatable and the base plate fixed;

wherein the mounting plate comprises a plurality of elongated mounting slots each configured to receive a first set of fastening devices to attach the mounting plate to the elevated mounting bracket;

wherein the base plate comprises a plurality of elongated mounting slots configured to receive a second set of fastening devices, the second set of fastening devices extending through the plurality of mounting slots, fixedly securing the swivel seat to the base plate and the elevated mounting bracket;

wherein the elevated mounting bracket comprises at least one channel for receiving at least one tie-down device to secure the swivel seat assembly.

17. The portable swivel seat of claim 16, wherein the mounting bracket comprises:

a leg;

a first arm;

a second arm; and a longitudinally extending open channel defined by the leg and a lip formed by a longitudinally extending edge of the second arm and receiving at least one tie-down device.

18. The portable swivel seat of claim 17, wherein the at least one tie-down device is a ratchet strap or over center quick release buckle and strap assembly.

\* \* \* \* \*